United States Patent
Pallares Del Egido et al.

(10) Patent No.: US 11,996,995 B2
(45) Date of Patent: May 28, 2024

(54) SEQUENTIAL PACKET MATCHING

(71) Applicant: Telefonaktiebolaget LM Ericsson (PUBL), Stockholm (SE)

(72) Inventors: Ruth Pallares Del Egido, Madrid (ES); Juan-Mario Martin-Sanchez, Madrid (ES); Carlos Jimenez Cordon, Madrid (ES); Miguel Angel Puente Pestaña, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 334 days.

(21) Appl. No.: 17/622,967

(22) PCT Filed: Jul. 22, 2019

(86) PCT No.: PCT/EP2019/069664
§ 371 (c)(1),
(2) Date: Dec. 27, 2021

(87) PCT Pub. No.: WO2021/001050
PCT Pub. Date: Jan. 7, 2021

(65) Prior Publication Data
US 2022/0272008 A1    Aug. 25, 2022

(30) Foreign Application Priority Data
Jul. 1, 2019    (EP) ..................... 19382558

(51) Int. Cl.
*H04L 43/028*    (2022.01)
*H04L 1/00*    (2006.01)
(Continued)

(52) U.S. Cl.
CPC .......... *H04L 43/028* (2013.01); *H04L 1/0083* (2013.01); *H04L 41/12* (2013.01); *H04L 43/062* (2013.01); *H04L 45/38* (2013.01)

(58) Field of Classification Search
CPC ... H04L 43/028; H04L 43/062; H04L 1/0083; H04L 41/12; H04L 45/38
See application file for complete search history.

(56) References Cited

U.S. PATENT DOCUMENTS

2020/0059992 A1*    2/2020    Skog ..................... H04L 45/38

OTHER PUBLICATIONS

3GPP TS 23.501 v16.0.2; Technical Specification; 3rd Generation Partnership Project; Technical Specification Group Services and System Aspects; System Architecture for the 5G System; Stage 2 (Release 16)—Apr. 2019.

(Continued)

*Primary Examiner* — Jianye Wu
(74) *Attorney, Agent, or Firm* — Baker Botts L.L.P.

(57) ABSTRACT

Disclosed herein is a method for evaluating data traffic in a communication network. The method comprising establishing a protocol session between a control plane, CP, node and a user plane, UP, node and configuring, by the CP node, a first detection rule to be used for event notification, and at least one next detection rule to be used for traffic detection. The first detection rule comprises an indicator indicating the highest precedence, and identifies a first instruction rule indicating an event to be notified and a continuation flag indicating evaluation of at least one next detection rule. The at least one next detection rule comprises an indicator indicating a lower precedence than the one in the first detection rule and identifies a next instruction rule to be applied to a matched traffic. The method also comprises determining, at the UP node and based on the continuation flag, whether the received packet matches any detection rule amongst the at least one next detection rule from higher to lower precedence.

18 Claims, 8 Drawing Sheets

(51) Int. Cl.
H04L 41/12 (2022.01)
H04L 43/062 (2022.01)
H04L 45/00 (2022.01)

(56) References Cited

OTHER PUBLICATIONS

3GPP TS 23.502 v16.0.2; Technical Specification; 3rd Generation Partnership Project; Technical Specification Group Services and System Aspects; Procedures for the 5G System; Stage 2 (Release 16)—Apr. 2019.
3GPP TS 29.244 v15.5.0; Technical Specification; 3rd Generation Partnership Project; Technical Specification Group Core Network and Terminals; Interface between the Control Plane and the User Plane Nodes; Stage 3 (Release 15)—Mar. 2019.
3GPP TSG CT WG4 Meeting #90; Xi'an, China; Source: Ericsson; Title: Control of traffic forwarding to support 5G LAN group communication (C4-191094)—Apr. 8-12, 2019.
3GPP TSG-SA2 Meeting #134; Sapporo, Japan; Change Request; Title: Support of forwarding of broadcast and multicast packets; Source to WG: Huawei, HiSilicon; Source to TSG: SA2 (S2-1907700)—Jun. 24, 2019-Jun. 28, 2019.
PCT International Search Report issued for International application No. PCT/EP2019/069664—dated Dec. 9, 2019.
PCT Written Opinion of the International Searching Authority issued for International application No. PCT/EP2019/069664—dated Dec. 9, 2019.

\* cited by examiner

SEQUENTIAL PACKET MATCHING

PRIORITY

This nonprovisional application is a U.S. National Stage Filing under 35 U.S.C. § 371 of International Patent Application Serial No. PCT/EP2019/069664 filed Jul. 22, 2019 and entitled "SEQUENTIAL PACKET MATCHING" which claims priority to European Patent Application No. 19382558.5 filed Jul. 1, 2019 both of which are hereby incorporated by reference in their entirety.

TECHNICAL FIELD

The present invention relates generally to the field of wireless communication. More particularly, it relates to sequential packet matching in wireless communication networks.

BACKGROUND

Tethering is the sharing of a mobile device's connection with other devices connected to it. Connection of a mobile device to other devices can typically be done over wireless LAN (Local Area Network using e.g. Wi-Fi), over Bluetooth or by a physical connection using a cable, e.g. through USB.

For IPv4 network, the tethering normally works via NAT (Network Address Translation) on the handset's existing data connection. So from the network point of view, there is just one device with a single IPv4 network address, though it is technically possible to attempt to identify multiple machines.

Operators typically detect if a certain UE (User Equipment, e.g. a mobile terminal) is providing connectivity to other tethered devices by means of traffic inspection mechanisms (e.g. DPI, Deep Packet Inspection, and heuristic inspection). The traffic coming from a subscriber (e.g. a UE) is typically inspected in order to detect tethering devices connected to the UE by searching for differences on the protocol headers of the packets in the flow to set up a fingerprint for the different devices behind the connection. A fingerprint typically consists of a certain set of parameters that enables identifying the traffic coming from a tethering device.

Incoming traffic is furthermore typically matched against a set of detection rules that specify the traffic filters or signatures used for matching.

However, operators are starting to demand specific event notifications (such as a request for start tethering) besides the regular traffic matching that are not compatible with the detection rules matching procedure that is currently supported in e.g. the 3GPP CUPS specification.

Therefore, there is a need for methods and apparatuses for enabling new use cases when performing traffic matching.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above disadvantages and to provide methods, control plane nodes and user plane nodes for enabling new use cases when performing traffic matching.

According to a first aspect, this is achieved by a method for evaluating data traffic in a communication network. The method comprising establishing a protocol session between a control plane, CP, node and a user plane, UP, node and configuring, by the CP node, a first detection rule to be used for event notification, and at least one next detection rule to be used for traffic detection. The first detection rule comprises an indicator indicating the highest precedence, and identifies a first instruction rule indicating an event to be notified and also identifies a continuation flag indicating evaluation of at least one next detection rule. The at least one next detection rule comprises an indicator indicating a lower precedence than the one in the first detection rule and identifies a next instruction rule to be applied to a matched traffic.

The method also comprises transmitting, from the CP node, the first detection rule and the at least one next detection rule towards the UP node, and receiving, by the UP node, the first detection rule and the at least one next detection rule.

The method also comprises determining, at the UP node, that a received packet matches the first detection rule and transmitting, from the UP node towards the CP node, a notification of the event indicated in the first instruction rule.

The method also comprises determining, at the UP node and based on the continuation flag, whether the received packet matches any detection rule amongst the at least one next detection rule from higher to lower precedence.

In some embodiments, the method further comprises, upon determining, at the UP node, that the received packet matches any detection rule amongst the at least one next detection rule, determining whether the matched next detection rule identifies the continuation flag. If the continuation flag is identified, the method comprises transmitting, from the UP node towards the CP node, a notification of the event indicated in the instruction rule of the matched next detection rule and determining, at the UP node, whether the received packet matches any detection rule amongst other next detection rules from higher to lower precedence. If the continuation flag is not identified, the method comprises applying, at the UP node, the next instruction rule of the matched next detection rule to the matched packet, and stopping, at the UP node, the packet matching for the received packet.

A second aspect is a method for evaluating data traffic in a communication network, the method carried out at a control plane, CP, node and comprising establishing a protocol session with a user plane, UP, node and configuring a first detection rule to be used for event notification, and at least one next detection rule to be used for traffic detection. The first detection rule comprises an indicator indicating the highest precedence, and identifies a first instruction rule indicating an event to be notified and also identifies a continuation flag indicating evaluation of at least one next detection rule. The at least one next detection rule comprises an indicator indicating a lower precedence than the one in the first detection rule and identifies a next instruction rule to be applied to a matched traffic.

The method also comprises transmitting, towards the UP node, the first detection rule and the at least one next detection rule and receiving, from the UP node, a notification of the event indicated in the first instruction rule.

In some embodiments, the method also comprises receiving, from the UP node, a notification of an event indicated in a next instruction rule of the at least one next detection rule.

A third aspect is a method for evaluating data traffic in a communication network. The method is carried out at a user plane, UP, node and comprises establishing a protocol session with a control plane, CP, node.

The method also comprises receiving, from the CP node, a first detection rule to be used for event notification, and at least one next detection rule to be used for traffic detection. The first detection rule comprises an indicator indicating the highest precedence, and identifies a first instruction rule indicating an event to be notified and also identifies a continuation flag indicating evaluation of at least one next detection rule. The at least one next detection rule comprises an indicator indicating a lower precedence than the one in the first detection rule and identifies a next instruction rule to be applied to a matched traffic.

The method also comprises determining that a received packet matches the first detection rule and transmitting, towards the CP node, a notification of the event indicated in the first instruction rule.

The method also comprises determining, based on the continuation flag, whether the received packet matches any detection rule amongst the at least one next detection rule from higher to lower precedence.

In some embodiments, upon determining that the received packet matches any detection rule amongst the at least one next detection rule, the method may further comprise determining whether the matched next detection rule identifies the continuation flag. If the continuation flag is identified, the method comprises transmitting, towards the CP node, a notification of the event indicated in the instruction rule of the matched next detection rule and determining whether the received packet matches any detection rule amongst other next detection rules from higher to lower precedence. If the continuation flag is not identified, the method comprises applying the instruction rule of the matched next detection rule to the matched packet, and stopping the packet matching for the received packet.

In some embodiments, any detection rule, amongst the first detection rule and the at least one next detection rule, is a Packet Detection Rule, PDR, that comprises a packet filter versus which packets are matched, and identifies one or more associated instruction rules.

In some embodiments, the one or more associated instruction rules comprises at least one of:
- a Forwarding Action Rule, FAR, which contains instructions related to the processing of the packets;
- a Quality of Service Enforcement Rules, QER, which contains instructions related to the QoS enforcement of the traffic;
- a User Reporting Rule, URR, which contains instructions related to traffic measurement and reporting; and
- a Buffering Action Rule, BAR, which contains buffering rules to apply to the matching packets.

In some embodiments, the continuation flag is included in one of: the PDR, the FAR, the QER, the BAR and the URR.

In some embodiments, the first instruction rule indicating the event to be notified is the URR.

In some embodiments, the event to be notified is any one (and/or one or more) of: tethering detection, video traffic start, and a specific application launch. In some embodiments the event may be of any other suitable type.

In some embodiments, the CP node implements a Session Management Function, SMF, the UP node implements User Plane Function, UPF, and the protocol session is a Packet Forwarding Control Protocol, PFCP, session.

A fourth aspect is a control plane, CP, node for evaluating data traffic in a communication network. The CP node is configured to establish a protocol session with a user plane, UP, node and configure a first detection rule to be used for event notification, and at least one next detection rule to be used for traffic detection. The first detection rule comprises an indicator indicating the highest precedence, and identifies a first instruction rule indicating an event to be notified and also identifies a continuation flag indicating evaluation of at least one next detection rule. The at least one next detection rule comprises an indicator indicating a lower precedence than the one in the first detection rule and identifies a next instruction rule to be applied to a matched traffic.

The CP node is also configured to transmit, towards the UP node, the first detection rule and the at least one next detection rule and receive, from the UP node, a notification of the event indicated in the first instruction rule.

In some embodiments, the CP node is further configured to receive, from the UP node, a notification of an event indicated in a next instruction rule of the at least one next detection rule.

In some embodiments, the CP node is further configured to carry out a method according to any one of the first or second aspect.

A fifth aspect is a user plane, UP, node for evaluating data traffic in a communication network. The UP node is configured to establish a protocol session with a control plane, CP, node and receive, from the CP node, a first detection rule to be used for event notification, and at least one next detection rule to be used for traffic detection. The first detection rule comprises an indicator indicating the highest precedence, and identifies a first instruction rule indicating an event to be notified and also identifies a continuation flag indicating evaluation of at least one next detection rule. The at least one next detection rule comprises an indicator indicating a lower precedence than the one in the first detection rule and identifies a next instruction rule to be applied to a matched traffic. The UP node is also configured to determine that a received packet matches the first detection rule; and transmit, towards the CP node, a notification of the event indicated in the first instruction rule. The UP nodes is also configured to determine, based on the continuation flag, whether the received packet matches any detection rule amongst the at least one next detection rule from higher to lower precedence.

In some embodiments, upon determining that the received packet matches any detection rule amongst the at least one next detection rule, the UP node is further configured to determine whether the matched next detection rule identifies the continuation flag. If the continuation flag is identified, the UP node is configured to transmit, towards the CP node, a notification of the event indicated in the instruction rule of the matched next detection rule and determine whether the received packet matches any detection rule amongst other next detection rules from higher to lower precedence. If the continuation flag is not identified, the UP node is configured to apply the instruction rule of the matched next detection rule to the matched packet, and stop the packet matching for the received packet.

In some embodiments, the UP node is configured to carry out a method according to any one of claims first or third aspects.

A sixth aspect is a computer program product comprising a non-transitory computer readable medium. The non-transitory computer readable medium has stored there on a computer program comprising program instructions. The computer program is configured to be loadable into a data-processing unit comprising a processor and a memory associated with or integral to the data-processing unit. When loaded into the data-processing unit, the computer program is configured to be stored in the memory. The computer program, when loaded into and run by the processor is configured to cause the processor to execute method steps according to any of the methods described in conjunction with any of the first, second or third aspects.

In some embodiments, any of the above aspects may additionally have features identical with or corresponding to any of the various features as explained above for any of the other aspects.

An advantage of some embodiments is that the execution rules associated with more than one detection rule (DR) for a certain packet enables new use cases as for example event notification simultaneously with packet detection.

Another advantage of some embodiments is that they enable matching to more than one packet detection rules, by linking several detection rules by means of a flag that indicates that evaluation should be continued for the next detection rule.

Yet another advantage of some embodiments is that they enable use cases involving sequential evaluation of different detection rules and the execution of different FARs, QERs and URRs associated with those detection rules.

Yet another advantage of some embodiments is that they can be implemented as an extension of current standards and specifications.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where sequential evaluation of detection rules for a data packet is enabled.

In 4G, Control and User Plane Separation (CUPS) typically enables a flexible placement of the separated control plane (PGW-C) and user plane (PGW-U) functions for supporting diverse deployment scenarios (e.g. central or distributed user plane function).

In 4G, the Sxb-interface is the reference point between PGW-C and PGW-U. The interface is specified in 3GPP TS 29.244. The protocol over the Sx interface is the so-called Packet Forwarding Control Protocol (PFCP).

Figure 1:
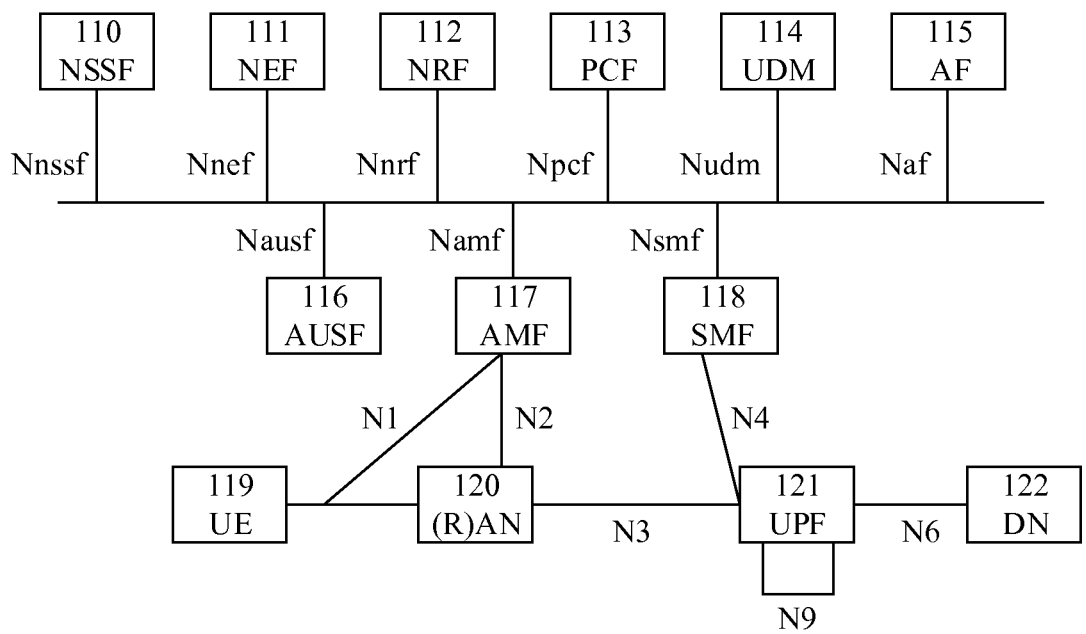
FIG. 1 is schematic drawing illustrating a network lay-out according to some embodiments.

In comparison, the 5G architecture natively separates Session Management Function (SMF) and User Plane Function (UPF) through the N4 reference point. FIG. 1 illustrates a schematic view of the relationship between the general functions of a typical 5G network structure that are related to the core network. The control plane comprises: Network Slice Selection Function (NSSF) 110; Network Exposure Function (NEF) 111; Network function Repository Function (NRF) 112; Policy Control Function (PCF) 113; Unified Data Management (UDM), 114; Application Function (AF) 115; Authentication Server Function (AUSF) 116; Access and Mobility Function (AMF) 117; and the Session Management Function (SMF) 118. Service based interfaces (Nnssf, Nnef, Nausf, Nnrf, Namf, Npcf, Nsmf, Nudm and Naf) are used between the functions on the control plane.

The User plane comprises: The User equipment (UE) 119; (Radio) Access Network ((R)AN) 120, User Plane Function (UPF) 121; and Data Network (DN) 122.

The control plane functions and user plane functions communicates between themselves by means of different interfaces. The UE 119 communicates with the AMF 117 through the N1 interface (and with the RAN through the radio access network, only depicted by a line between UE 119 and (R)AN 120). (R)AN communicates with the AMF 117 through the N2 interface, and with the UPF 121 through the N3 interface. The UPF 121 communicates with the SMF 118 through the N4 interface, with itself through the N9 interface and with the DN 122 through the N6 interface.

The 5G structure share many functions with its predecessors and much of the network architecture and structure is similar. Hence, the embodiments described herein are applicable to other network architectures such as 4G, but for simplicity, the embodiments described herein will be described in association with the 5G architecture.

In CUPS the UPF (user plane function) reports to the SMF (control plane function) the capabilities it supports. The capabilities are standardized and comprise among others: Downlink Data Buffering (BUCP); Downlink Data Notification Delay (DDND); DL Buffering Duration (DLBD); Traffic Steering (TRST); Header Enrichment of Uplink Traffic (HEEU); Sending of End Marker packets (EMPU) and support of Quota Action (QUOAC).

The SMF controls the packet processing in the UPF by establishing, modifying or deleting PFCP sessions and by provisioning (i.e. adding, modifying or deleting) PDRs (Packet Detection Rules), FARs (Forwarding Action Rules), QERs (Quality of Service Enforcement Rules), URRs (Usage Reporting Rules) and/or BARs (Buffering Action Rules) per PFCP session. A PFCP session may typically correspond to an individual Protocol Data Unit (PDU) session or a standalone PFCP session not tied to any PDU session.

Each PDR contains a PDI (Packet Detection Information) specifying the traffic filters or signatures against which incoming packets are matched. Each PDR is associated to the following rules providing the set of instructions to apply to the packets matching the PDI:

One FAR, which contains instructions related to the processing of the packets, specifically forwards, duplicate, drop or buffer the packet with or without notifying the Control Plane Function (SMF) about the arrival of a downlink packet.

Zero, one or more QERs, which contain instructions related to the QoS enforcement of the traffic.

Zero, one or more URRs, which contain instructions related to traffic measurement and reporting.

Zero, one or more BARs, which contain the buffering rules to apply to the matching packets.

As noted above, operators are starting to demand specific event notifications besides the regular traffic matching (PDR) and other rules (URR, QER, etc.) that are note compatible with the PDR matching procedure supported in the 3GPP CUPS specification. Some examples of these new uses cases (i.e. the event notifications) are:

Notification by the UPF to the SMF about the detection of start Tethering usage so the SMF can report it to the PCF.

Notification by the UPF to the SMF about detection of video traffic and to increase the Quality of Service of the bearer.

Parental control, the UPF may e.g. notify the SMF about an application launch (such as Facebook or Youtube or similar) in order to optionally block it remotely.

The current PFCP specification does not allow these new types of event reporting rules along with the regular rules (i.e. FAR, URR, QER), since different traffic matching conditions are needed apart from the PDR associated with the regular FAR, URR or QER.

Hence, the current 3GPP CUPS specification does not support the above use cases as it does not allow notifying an event at the same time as doing packet detection of the traffic and apply other enforcements.

The embodiments herein propose solving the above problems by enabling sequential evaluation of detection rules (in this disclosure, the term detection rules is interchangeable with the term packet detection rules, PDR).

Figures 2A, 2B:
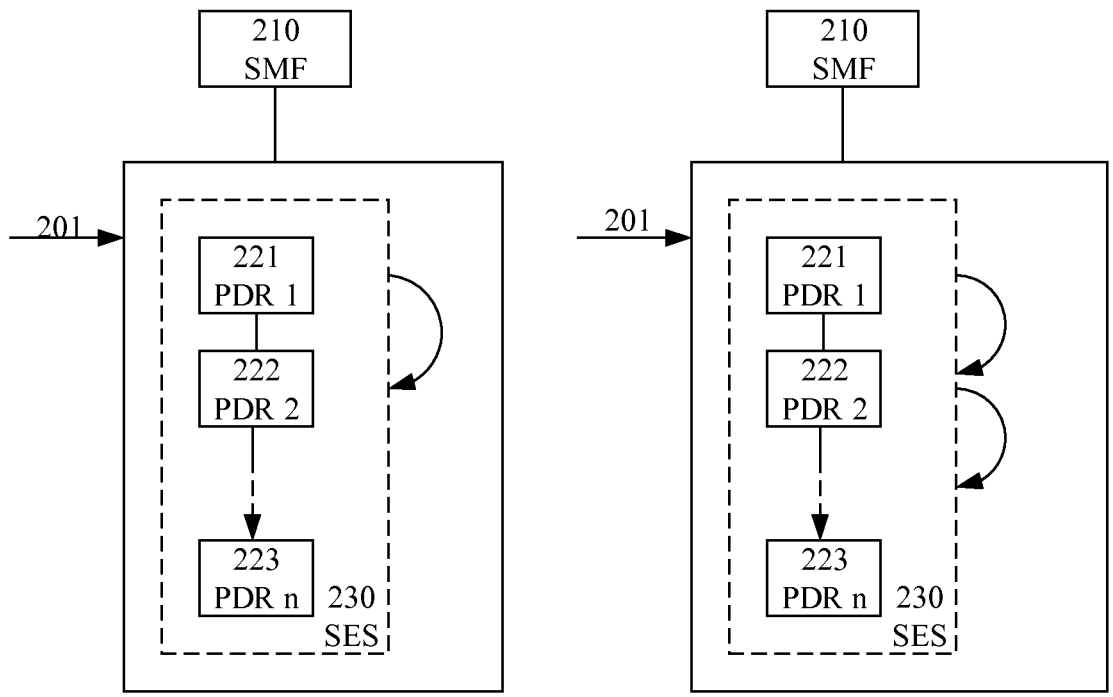
FIG. 2a-2b are a schematic drawing illustrating sequential detection rules according to some embodiments.

FIGS. 2a and 2b schematically illustrate configuration of one or more PDRs (PDR 1-PDR n) 221-223.

In FIG. 2a a SMF 210 has configured a string of PDRs 221-223. The first PDR (PDR 1) 221 is configured with a URR for event detection, a flag and a precedence along with the normal detection rules. Incoming data packets (denoted by arrow 201) are matched against the PDRs 221-223 in an established protocol session (SES 230) between e.g. the SMF and a UPF (such as a control plane node and a user plane node/base station and communication device). Each of the PDRs 221-223 has been configured with a precedence and traffic matching is performed firstly against PDR 1, 221 having the highest precedence among the configured PDRs. PDR 1 has been configured by the SMF with a flag which indicates that the PDR 1 is to be evaluated for events and that traffic matching is to be performed for a subsequent PDR having a next highest precedence, in this case PDR 2, 222. PDR 2 has not been configured with a flag, and hence no more event evaluation is to be performed. Packet detection will be performed on the rest of the PDRs and all of the comprised rules will be evaluated/executed.

In FIG. 2b also PDR 2 222 comprise a flag indicating that the subsequent PDR is to be evaluated for event. The event evaluation will be performed for as long as there is PDRs having been configured with a flag. The flag indicates that e.g. the URR should be used for event evaluation and that the FAR should not be executed in these PDRs. When the incoming packet is matched against a PDR that does not comprise a flag, this is an indication that no more event evaluation is to be performed, but instead should packet detection be performed and the e.g. the FAR in the PDR not comprising the flag should be executed.

The Flag may e.g. be an Information Element of the PDR set by the CP node.

Figure 3:
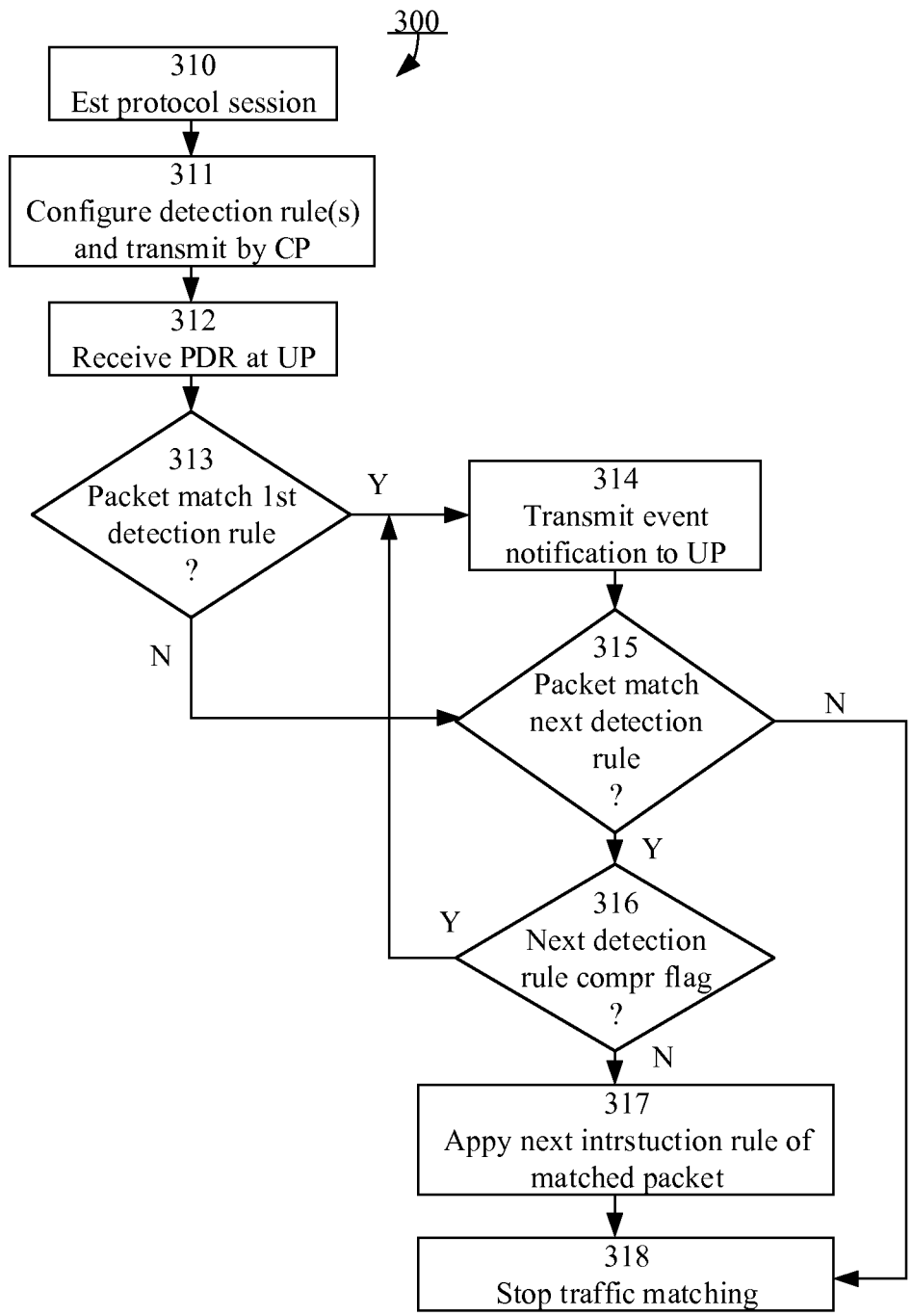
FIG. 3 is a flowchart illustrating example method steps according to some embodiments.

FIG. 3 illustrates an example method 300 according to some embodiments. The method 300 may be for evaluating data traffic in a communication network. The method 300 may be carried out by a user plane (UP) node and a control plane (CP) node. It should be noted that the terms UP node and CP node are illustrative of the entities that host the control plane and the user plane. Hence a CP node may e.g. be a base station, a remote server or a computer. The UP node may e.g. be a UE, a mobile device, a computer or any other type of suitable communication device.

The method 300 may e.g. be carried out in a network architecture such as that described in conjunction with FIG. 1 (or other types of network architectures such as 4G), and may concerns detection rules such as the PDRs described in conjunction with FIGS. 2a-2b.

The method starts in step 310 with establishing a protocol session between a control plane, CP, node and a user plane, UP, node. The protocol session may e.g. be a Packet Forwarding Control Protocol (PFCP) session.

Then in step 311 the CP node configures a first detection rule to be used for event notification, and at least one next detection rule to be used for traffic detection. The first detection rule comprises an indicator indicating the highest precedence, and identifies a first instruction rule indicating an event to be notified and also identifies a continuation flag indicating evaluation of at least one next detection rule.

The at least one next detection rule comprises an indicator indicating a lower precedence than the one in the first detection rule and identifies a next instruction rule to be applied to a matched traffic.

Also in step 311, the CP node transmits the first detection rule and the at least one next detection rule towards the UP node.

In step 312 the UP node receives the first detection rule and the at least one next detection rule.

Then, in step 313, the UP node determines whether a received packet matches the first detection rule.

If/when it is determined that the received packet does not match the first detection rule (N-path out of 313), the method continues in step 315 where the UP node determines based on the continuation flag, whether the received packet matches any detection rule amongst the at least one next detection rule from higher to lower precedence.

When it is determined in step 313 that the received packet matches the first detection rule (Y-path out of 313), the method continues in step 314 where the UP node transmits towards the CP node a notification of the event indicated in the first instruction rule.

Then in step 315, the UP node determines based on the continuation flag, whether the received packet matches any detection rule amongst the at least one next detection rule from higher to lower precedence.

Hence, the flag enables for sequential evaluation of the detection rules (e.g. the PDRs), and several detection rules may be matched for event evaluation prior to performing packet detection since the flag indicates that not all rules comprised in the detection rule (such as the FAR) should be carried out.

If/when it is determined that the received packet does not match the next detection rule (N-path out of 315), the method continues in step 318 by stopping packet matching for the received packet.

In some embodiments, the method 300 may continue in step 316. E.g. if in step 315 the UP node determines that the received packet matches any detection rule amongst the at least one next detection rule (Y-path out of 315), the method continues in step 316 with determining whether the matched next detection rule identifies the continuation flag. If/when the continuation flag is identified (Y-path out of 316) the method loops back to step 314 where the UP node transmits towards the CP node, a notification of the event indicated in the instruction rule of the matched next detection rule and further in step 315 with determining, at the UP node, whether the received packet matches any detection rule amongst other next detection rules from higher to lower precedence.

Hence, the method will loop between steps 314-316 until the packet is matched against a detection rule that does not comprise (i.e. is not configured with) a flag.

If/when the continuation flag is not identified (N-path out of 316), the method continues in step 317 where the UP node applies the next instruction rule of the matched next detection rule to the matched packet, and stops in step 318 the packet matching for the received packet.

Figure 4:
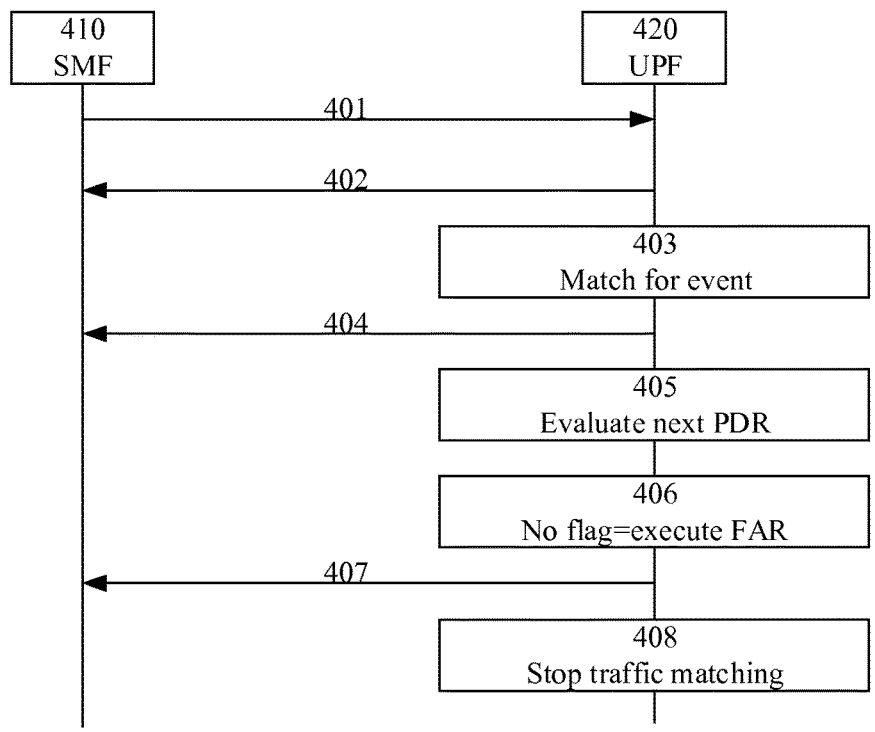
FIG. 4 is a combined flowchart and signaling illustrating example method steps according to some embodiments.

FIG. 4 illustrates a combined flowchart and signaling diagram between a SMF 410 and UPF 420. The SMF may e.g. be the SMF or CP node as described in conjunction with any of the previous figures. In the same manner, the UPF may be the UPF or UP node as described in conjunction with any of the previous figures. Method/signaling diagram as described in conjunction with FIG. 4 may be the method as described in conjunction with FIG. 3.

In FIG. 4, the SMF may establish a protocol session, e.g. by transmitting 401 a PFCP session establishment request to the UPF (compare with step 310 of the method 300). The establishment request may comprise a session ID and one or more detection rules (such as PDRs) being configured with a precedence, a flag and instruction rules (compare with step 311 of the method 300).

The UPF may respond 402 to the SMF with an acknowledgement of establishing the protocol session. The UPF may then start matching in step 403 traffic (i.e. data packets) for event detection to the received and configured detection rules (compare with step 313 of method 300). If the packet matches, the event is notified (e.g. using the URR of the detection rule that matched) 404 to the SMF (compare with step 314 of the method 300) which then may take appropriate measures based on the type of detected event. Then in step 405 the UPF evaluates the following detection rule, which may be the next in line based on the precedence configured to the PDR (compare with step 315 of the method 300).

The precedence is configured by the SMF, as noted above, and may be sequential in an increasing or decreasing order. Hence a highest precedence (as described in conjunction with any of the previous figures) may have a lowest or highest number, such as 0-N, where N is an integer. The precedence may of course be represented by other symbols or being in different formats without deviating from the scope of the embodiments herein, what is of importance is that the precedence indicates that the detection rules that are configured with flags should be matched against first and prior to the detection rules that are not configured with flags.

In step 406, the UPF may determine that a following detection rule does not comprise (i.e. is not configured with) a flag (compare with step 316 of method 300). The UPF may then also in step 406 execute the rules (FAR, QER etc) associated with the detection rule that matched and does not comprise a flag (compare with step 317 in the method 300). Then the UPF signals to the SMF 407 the URR reporting of the executed instructions and in step 408 traffic matching is stopped (compare with step 317-318 of method 300).

Figure 5:
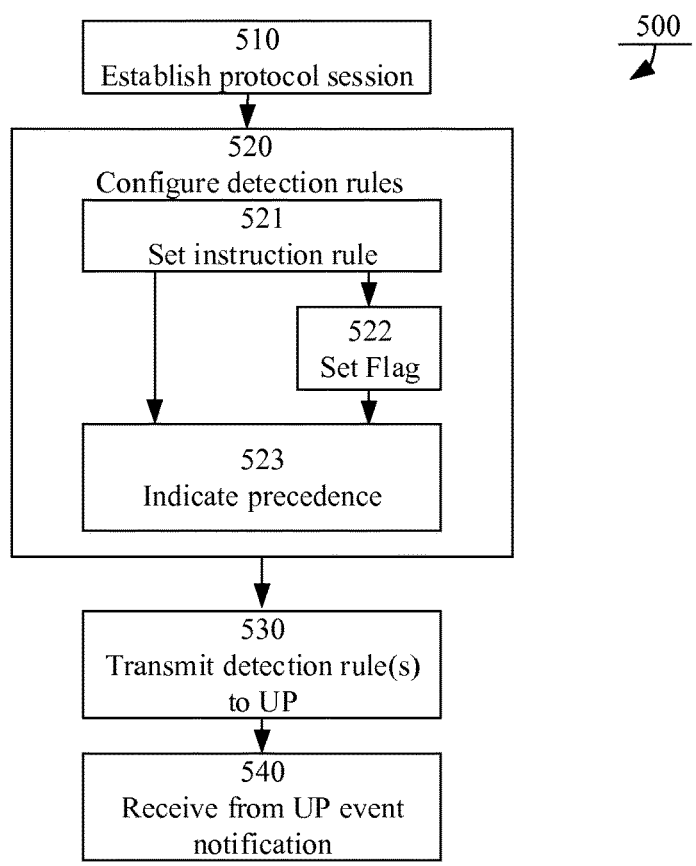
FIG. 5 is a flowchart illustrating example method steps according to some embodiments.

FIG. 5 illustrates an example method 500 for evaluating data traffic in a communication network. The method 500 may be carried out at a control plane, CP, node.

The CP node may in some embodiments be the CP node or SMF as described in conjunction with any of the previous figures. The method 500 may in some embodiments, be part of or be combined with the methods 300 and 400 as described in conjunction with the previous figures.

The method 500 starts in step 510 with establishing a protocol session with a user plane, UP, node. The protocol session may e.g. be a PCFP session (compare with steps 310 and 401 of the method 300 and 400). The UP node may in some embodiments be the UP node or UPF as described in conjunction with any of the previous figures. The method 500 may in some embodiments, be part of or be combined with the methods 300 and 400 as described in conjunction with the previous figures.

Then in step 520, the UP node configures a first detection rule to be used for event notification, and at least one next detection rule to be used for traffic detection (compare with steps 311 and 401 of the methods 300 and 400).

The first detection rule comprises an indicator indicating the highest precedence (sub-step 523), and identifies a first instruction rule (sub-step 521) indicating an event to be notified and also identifies a continuation flag (sub-step 522) indicating evaluation of at least one next detection rule, and wherein the at least one next detection rule comprises an indicator indicating a lower precedence (sub-step 523) than the one in the first detection rule and identifies a next instruction rule (sub-step 521) to be applied to a matched traffic.

After configuring the instruction rules, the method continues in step 530 with transmitting, towards the UP node, the first detection rule and the at least one next detection rule (compare with steps 311 and 401 of methods 300 and 400).

Then in step 540, the CP node receives, from the UP node, a notification of the event indicated in the first instruction rule (compare with steps 314 and 404 of the methods 300 and 400). Based on the received event notification (i.e. the notification of the event), the CP node may take appropriate actions such as remotely block certain apps, increase QoS for a user, or identify tethering.

In some embodiments, the method 500 may further comprise receiving, from the UP node, a notification of an event indicated in a next instruction rule of the at least one next detection rule in the step 540 (compare with steps 317 and 407 of the method 300 and 400).

Figure 6:
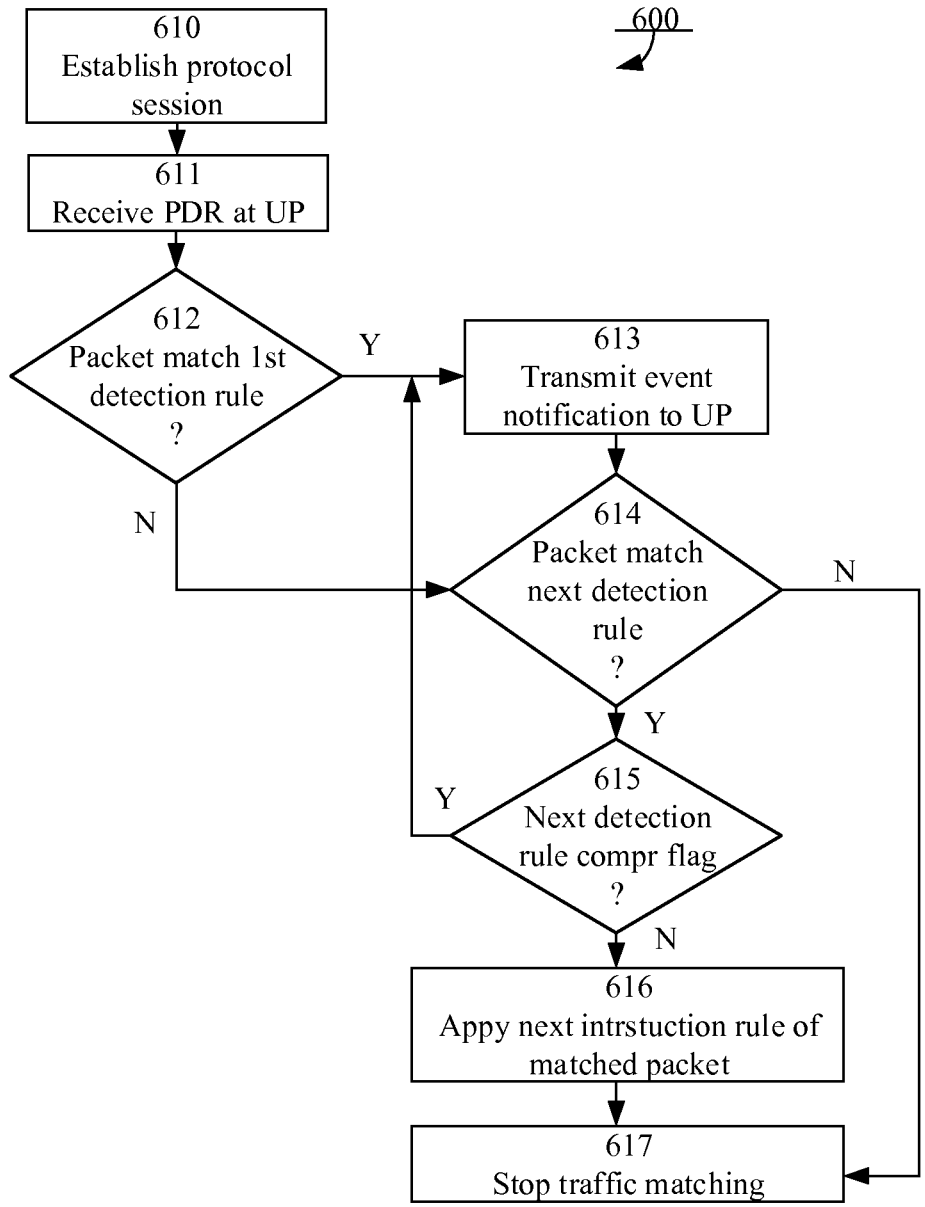
FIG. 6 is a flowchart illustrating example method steps according to some embodiments.

FIG. 6 illustrates an example method 600 according to some embodiments. The method 600 may be for evaluating data traffic in a communication network. The method may be carried out at a user plane, UP, node. The UP node may in some embodiments be the UP node or UPF as described in conjunction with any of the previous figures.

The method 600 starts in step 610 with establishing a protocol session with a control plane, CP, node (compare with steps 310, 401-402 and 510 of methods 300-500). The CP node may in some embodiments be the CP node or SMF as described in conjunction with any of the previous figures.

Then the method 600 continues in step 611 with receiving, from the CP node, a first detection rule to be used for event notification, and at least one next detection rule to be used for traffic detection (compare with steps 312, 401 and 530 of the methods 300-500). The first detection rule comprises an indicator indicating the highest precedence, and identifies a first instruction rule indicating an event to be notified and also identifies a continuation flag indicating evaluation of at least one next detection rule, and the at least one next detection rule comprises an indicator indicating a lower precedence than the one in the first detection rule and identifies a next instruction rule to be applied to a matched traffic (compare with steps 520-523 of method 500).

Then in step 612 the method 600 comprises determining that a received packet matches the first detection rule (compare with step 313 and 403 of methods 300-400).

If/when it is determined that the received packet does not match the first detection rule (N-path out of 612 (compare with steps 313 of method 300), the method continues in step 614, the UP node determines based on the continuation flag, whether the received packet matches any detection rule amongst the at least one next detection rule from higher to lower precedence (compare to steps 315 and 403 of method 300-400).

When it is determined in step 612 that the received packet matches the first detection rule (Y-path out of 612, compare with steps 313 and 403 of methods 300-400), the method continues in step 613 where the UP node transmits towards the CP node a notification of the event indicated in the first instruction rule (compare with steps 314, 404 and 540 of methods 300-500).

Then in step 614, the UP node determines based on the continuation flag, whether the received packet matches any detection rule amongst the at least one next detection rule from higher to lower precedence (compare to steps 315 and 403 of method 300-400).

Hence, the flag enables for sequential evaluation of the detection rules (e.g. the PDRs), and several detection rules may be matched for event evaluation prior to performing packet detection since the flag indicates that not all rules comprised in the detection rule (such as the FAR) should be carried out.

If/when it is determined that the received packet does not match the next detection rule (N-path out of 614 (compare with steps 315 of method 300), the method continues in step 617 where the UP node stops the packet matching for the received packet (compare with steps, 318 and, 408 of methods 300-400)

In some embodiments, the method 600 may further continue in step 615. E.g. if in step 614 the UP node determines that the received packet matches any detection rule amongst the at least one next detection rule (Y-path out of 614), the method continues in step 615 (compare with steps 316 and 405 of methods 300-400) with determining whether the matched next detection rule identifies the continuation flag.

If/when the continuation flag is identified (Y-path out of 615 compare with steps 316 and 403 of methods 300-400) the method loops back to step 613 where the UP node transmits towards the CP node, a notification of the event indicated in the instruction rule of the matched next detection rule and further in step 614 with determining, at the UP node, whether the received packet matches any detection rule amongst other next detection rules from higher to lower precedence.

Hence, the method will loop between steps 613-615 until the packet is matched against a detection rule that does not comprise (i.e. is not configured with) a flag.

If/when the continuation flag is not identified (N-path out of 615 compare with steps 316 and 406 of methods 300-400), the method continues in step 616 where the UP node applies the next instruction rule of the matched next detection rule to the matched packet, and stops in step 617 the packet matching for the received packet (compare with steps 317, 318 and 407, 408 of methods 300-400).

In some embodiments, any detection rule, amongst the first detection rule and the at least one next detection rule, is a Packet Detection Rule, PDR, that comprises a packet filter versus which packets are matched, and identifies one or more associated instruction rules. Packet Detection Rule is a common term for 5G architecture, however the embodiments herein are not limited to 5G-networks and are applicable on other detection rules. However, the terms may be used interchangeably in this disclosure.

In some embodiments, the one or more associated instruction rules comprises at least one of:
- a Forwarding Action Rule, FAR, which contains instructions related to the processing of the packets;
- a Quality of Service Enforcement Rules, QER, which contains instructions related to the QoS enforcement of the traffic;
- a User Reporting Rule, URR, which contains instructions related to traffic measurement and reporting; and
- a Buffering Action Rule, BAR, which contains buffering rules to apply to the matching packets.

In some embodiments, the continuation flag is included in one of: the PDR, the FAR, the QER, the BAR and the URR. In a detection rule (or PDR) where the flag is not set, the instruction rules URR, QER, BAR and FAR will all be evaluated and executed. Executing the FAR leads to that packet detection is performed and traffic matching is stopped. Hence if the FAR were to be executed in each detection rule, it would not be possible to perform event evaluation for multiple events. The flag can be set in either of the instruction rules and will indicate to the UP node that it should not execute all of the instruction rules comprised in the detection rule (such as the FAR) but should instead utilize the URR to report events to the CP node.

The CP node may e.g. configure certain detection rules for event notification, for example, if a start of tethering is to be detected, the CP node will configure a detection rule for event notification which will have tethering matching conditions which will be detected by the UP node as it evaluates the URR of the detection rule. If the flag is set, then the UP node will continue evaluation for events in a subsequent detection rule which may be configured for a different event evaluation.

Hence in some embodiments, the first instruction rule indicating the event to be notified is the URR.

In some embodiments, the event to be notified is any one of: tethering detection, video traffic start, and a specific application launch.

In some embodiments, the CP node implements a Session Management Function, SMF, the UP node implements User Plane Function, UPF, and the protocol session is a Packet Forwarding Control Protocol, PFCP, session.

Figure 7:
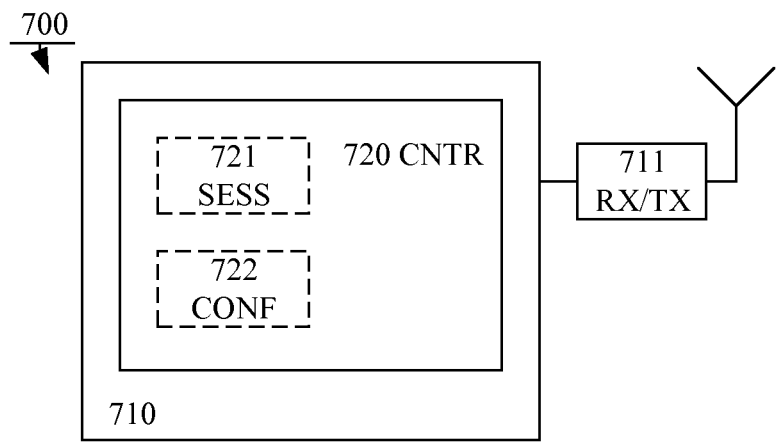
FIG. 7 is a schematic block diagram illustrating an example arrangement according to some embodiments.

FIG. 7 illustrates an arrangement 700 of a control plane, CP, node 710 for evaluating data traffic in a communication network. The CP node may e.g. be the CP node or SMF as described in conjunction with any of the preceding figures and may carry out any of the methods 300-500 as previously described. The CP node is configured to establish a protocol session with a user plane, UP, node and configure a first detection rule to be used for event notification, and at least one next detection rule to be used for traffic detection. The first detection rule comprises an indicator indicating the highest precedence, and identifies a first instruction rule indicating an event to be notified and also identifies a continuation flag indicating evaluation of at least one next detection rule. The at least one next detection rule comprises an indicator indicating a lower precedence than the one in the first detection rule and identifies a next instruction rule to be applied to a matched traffic.

The CP node 710 is also configured to transmit, towards the UP node, the first detection rule and the at least one next detection rule and receive, from the UP node, a notification of the event indicated in the first instruction rule.

In some embodiments the CP node 710 is further configured to receive, from the UP node, a notification of an event indicated in a next instruction rule of the at least one next detection rule.

In some embodiments, the CP node 710 may comprise controlling circuitry (CNTR; e.g. a controller) 720 configured to cause establishment of a protocol session with a user plane, UP, node and cause configuration of a first detection rule to be used for event notification, and at least one next detection rule to be used for traffic detection. To this end, the controlling circuitry 720 may comprise or be otherwise associated with a configurer (CONF; e.g. configuration circuitry or a configuration module) 722 for configuring the first and at least one next detection rule. The controlling circuitry may further comprise, or be otherwise associated with, a session establisher (SESS; e.g., establishing circuitry or an establishing module) 721 for establishing sessions with the UP node.

The CP node 710 may further comprise an antenna arrangement (such as a transceiver, transmitter, or receiver) (RX/TX) 711 which may be caused by the controlling circuitry to transmit, towards the UP node, the first detection rule and the at least one next detection rule and receive, from the UP node, a notification of the event indicated in the first instruction rule.

In some embodiments, the CP node 710 is configured to carry out a method according to any one of the previously described methods 300-500.

Figure 8:
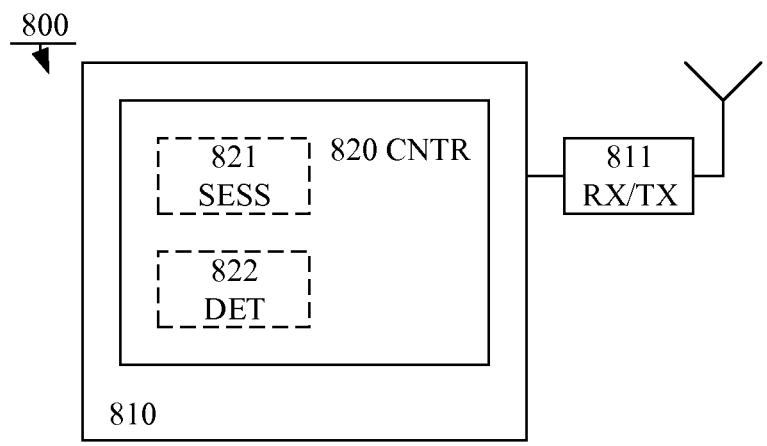
FIG. 8 is a schematic block diagram illustrating an example arrangement according to some embodiments.

FIG. 8 illustrates an arrangement 800 of a user plane, UP, node 810 for evaluating data traffic in a communication network. The UP node 810 may be UP node or UPF as described in conjunction with any of the previous figures. The UP node 810 may be configured to carry out any of the methods 300, 400 and 600 as described in conjunction with the FIGS. 3, 4 and 6.

The UP node 810 is configured to establish a protocol session with a control plane, CP, node. The CP node may e.g. be the CP node or SMF as described in conjunction with any of the previous figures.

The UP node 810 may be configured to receive, from the CP node, a first detection rule to be used for event notification, and at least one next detection rule to be used for traffic detection. The first detection rule comprises an indicator indicating the highest precedence, and identifies a first instruction rule indicating an event to be notified and also identifies a continuation flag indicating evaluation of at least one next detection rule. The at least one next detection rule comprises an indicator indicating a lower precedence than the one in the first detection rule and identifies a next instruction rule to be applied to a matched traffic. The UP node may be configured to determine that a received packet matches the first detection rule and to transmit, towards the CP node, a notification of the event indicated in the first instruction rule.

In some embodiments, the UP node may be configured to determine, based on the continuation flag, whether the received packet matches any detection rule amongst the at least one next detection rule from higher to lower precedence.

To this end, in some embodiments, the arrangement 800 of the UP node 810 may further comprise a controlling circuitry (CNTR; e.g., a controller) 820 configured to cause establishment of a protocol session with a control plane, CP, node. The controlling circuitry may be configured to cause the UP node to receive, from the CP node, a first detection rule to be used for event notification, and at least one next detection rule to be used for traffic detection. The first detection rule comprises an indicator indicating the highest precedence, and identifies a first instruction rule indicating an event to be notified and also identifies a continuation flag indicating evaluation of at least one next detection rule. The at least one next detection rule comprises an indicator indicating a lower precedence than the one in the first detection rule and identifies a next instruction rule to be applied to a matched traffic. The controlling circuitry 820 may be configured to cause determination of that a received packet matches the first detection rule and to cause transmission, towards the CP node, of a notification of the event indicated in the first instruction rule.

In some embodiments, the controlling circuitry 820 may be configured to determine, based on the continuation flag, whether the received packet matches any detection rule amongst the at least one next detection rule from higher to lower precedence.

To this end, the controlling circuitry 820 may comprise, or be otherwise associated with, a session establisher (SESS; e.g., establishing circuitry or an establishing module) 821 and a determiner (DET; e.g., determining circuitry or a determining module). The UP node arrangement may further comprise a antenna arrangement such as a transceiver, transmitter, and/or receiver (RX/TX) 811.

The controlling circuitry may be configured to cause the session establisher 821 to establish a protocol session, and cause the determiner 822 to determine whether a received packet matches the first detection rule and determine, based on the continuation flag, whether the received packet matches any detection rule amongst the at least one next detection rule from higher to lower precedence. In some embodiments, the controlling circuitry may be configured to cause the antenna arrangement to transmit or receive notifications and configured detection rules to/from the CP node.

In some embodiments, upon determining that the received packet matches any detection rule amongst the at least one next detection rule, the UP node (or the controlling circuitry e.g. by causing the determiner) is further configured to determine whether the matched next detection rule identifies the continuation flag.

If/when the continuation flag is identified, the UP node is configured to (or the controlling circuitry by e.g. causing the antenna arrangement to) transmit, towards the CP node, a notification of the event indicated in the instruction rule of the matched next detection rule and determine whether the received packet matches any detection rule amongst other next detection rules from higher to lower precedence.

If/when the continuation flag is not identified, the UP node is configured to apply (or the controlling circuitry is configured to cause application of) the instruction rule of the matched next detection rule to the matched packet, and stop the packet matching for the received packet.

In some embodiments, the UP node 810 is configured to carry out any of the methods 300, 400 and 600 as described in conjunction with the FIGS. 3, 4 and 6.

Figure 9:
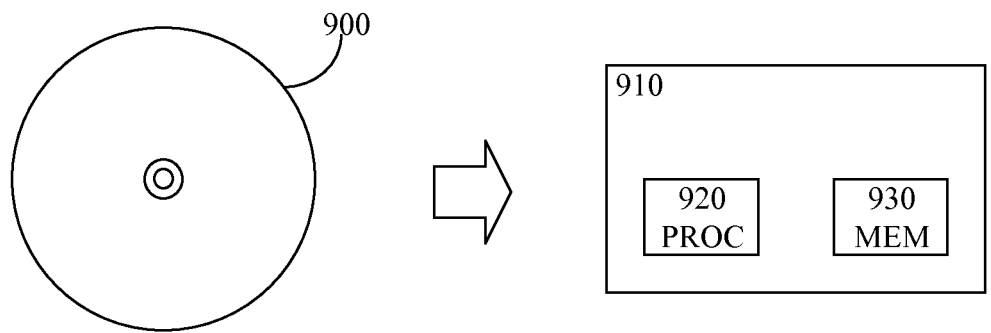
FIG. 9 is a schematic drawing illustrating an example computer program product according to some embodiments.

FIG. 9 illustrates a computer program product comprising a non-transitory computer readable medium 900. The non-transitory computer readable medium 900 has stored thereon a computer program comprising program instructions. The computer program is configured to be loadable into a data-processing unit 910, comprising a processor 920 and a memory 930 associated with or integral to the data-processing unit.

When loaded into the data-processing unit 910, the computer program is configured to be stored in the memory 930, wherein the computer program, when loaded into and run by the processor 920 is configured to cause the processor to execute method steps according to any of the methods described in conjunction with the FIGS. 3-6.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

According to some embodiments, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit.

Figure 10:
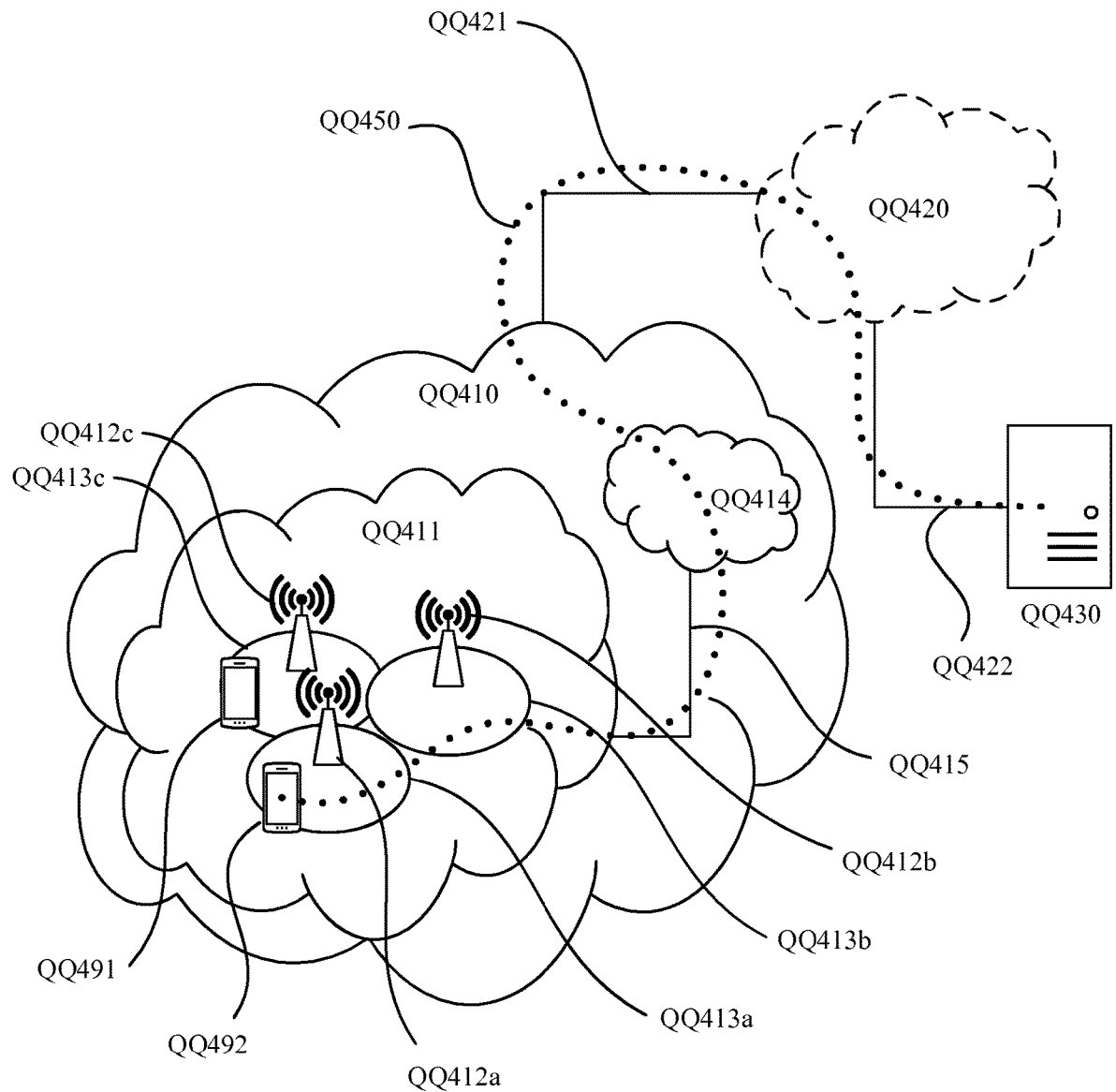
FIG. 10 illustrates a telecommunication network connected via an intermediate network to a host computer in accordance with some embodiments.

FIG. 10 illustrates a telecommunication network connected via an intermediate network to a host computer in accordance with some embodiments.

With reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 11:
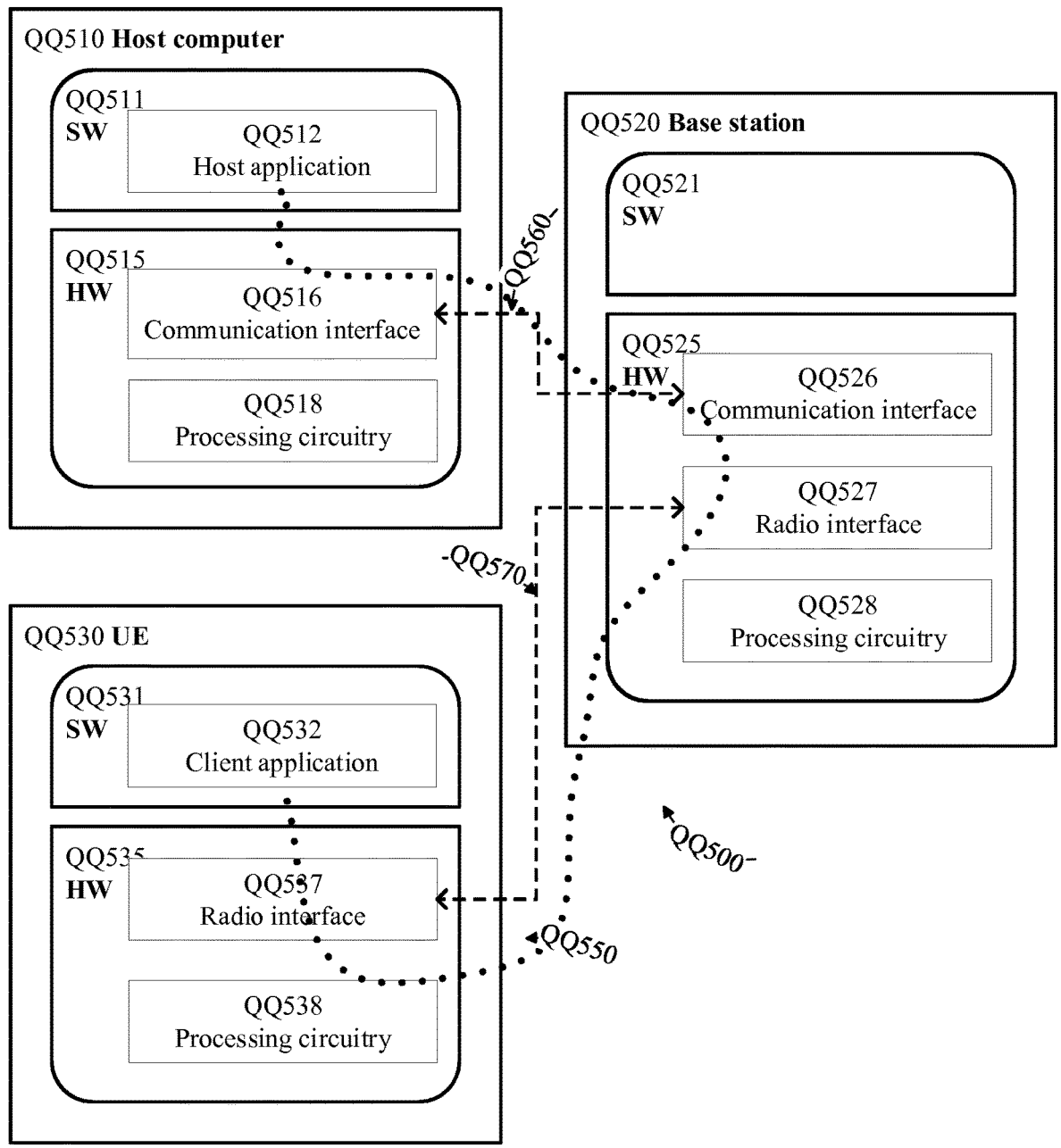
FIG. 11 illustrates a host computer communicating via a base station with a user equipment over a partially wireless connection in accordance with some embodiments.

FIG. 11 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520.

Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve security as explained above.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 12:
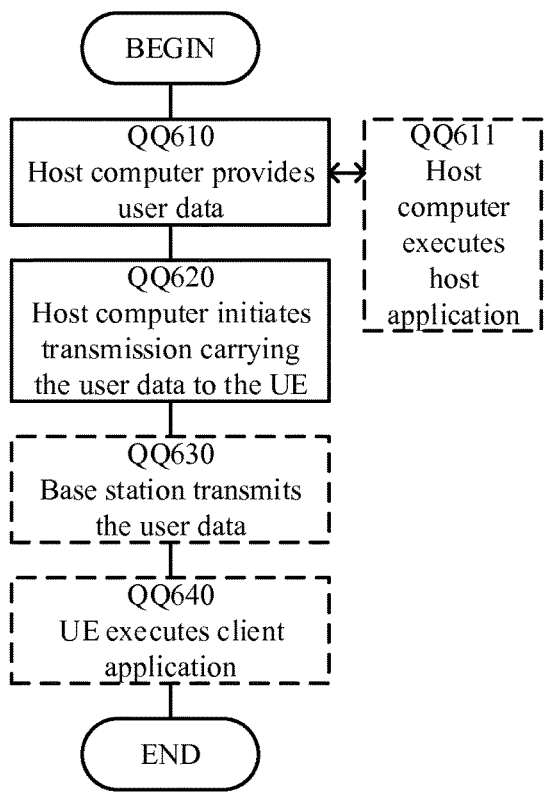
FIG. 12 is a flowchart illustrating example method steps implemented in a communication system including a host computer, a base station and a user equipment in accordance with some embodiments.

FIG. 12 illustrates methods implemented in a communication system including a host computer, a base station and a user equipment in accordance with some embodiments FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step QQ610, the host computer provides user data. In sub-step QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
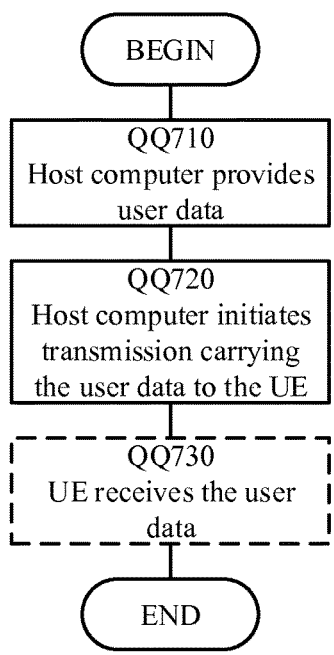
FIG. 13 is a flowchart illustrating example method steps implemented in a communication system including a host computer, a base station and a user equipment in accordance with some embodiments.

FIG. 13 illustrates methods implemented in a communication system including a host computer, a base station and a user equipment in accordance with some embodiments FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step QQ710 of the method, the host computer provides user data. In an optional sub-step (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 14:
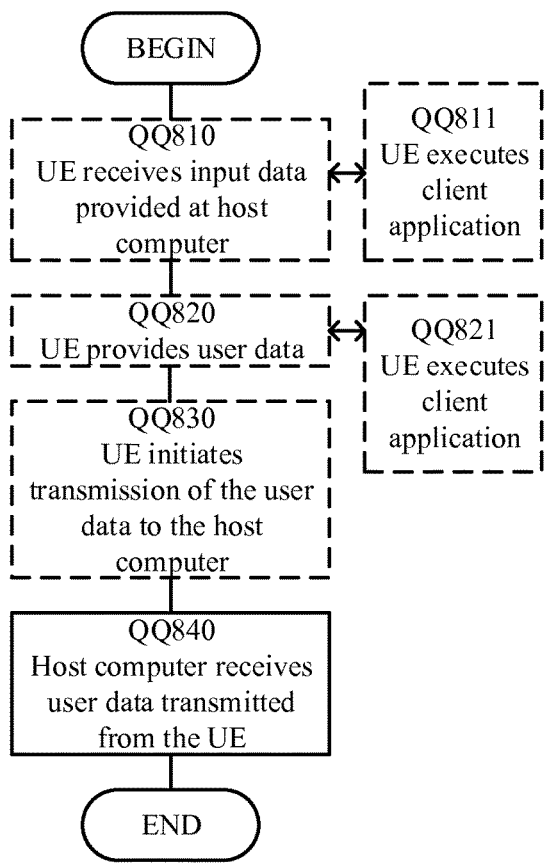
FIG. 14 is a flowchart illustrating example method steps implemented in a communication system including a host computer, a base station and a user equipment in accordance with some embodiments.

FIG. 14 illustrates methods implemented in a communication system including a host computer, a base station and a user equipment in accordance with some embodiments FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step QQ810 (which may be optional), the UE receives input data provided by the host computer. Additionally or alternatively, in step QQ820, the UE provides user data. In sub-step QQ821 (which may be optional) of step QQ820, the UE provides the user data by executing a client application. In sub-step QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in sub-step QQ830 (which may be optional), transmission of the user data to the host computer. In step QQ840 of the method, the host computer receives the user data transmitted from the UE, in accordance with the teachings of the embodiments described throughout this disclosure.

Figure 15:
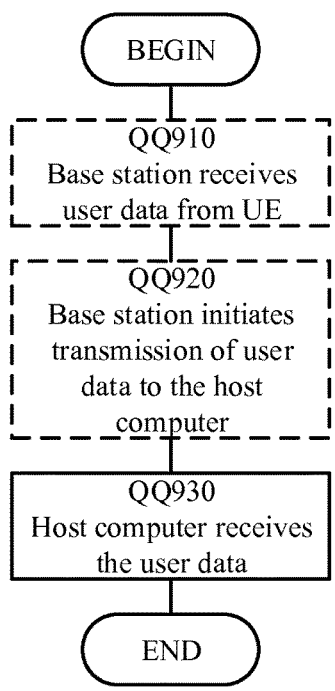
FIG. 15 is a flowchart illustrating example method steps implemented in a communication system including a host computer, a base station and a user equipment in accordance with some embodiments.

FIG. 15 illustrates methods implemented in a communication system including a host computer, a base station and a user equipment in accordance with some embodiments FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely for illustrative purpose and by no means limiting. Instead, all variations that fall within the range of the claims are intended to be embraced therein.

EXAMPLE EMBODIMENTS

Group A Embodiments

A1. A method (300) for evaluating data traffic in a communication network performed by a wireless device, the method comprising:
Establishing (310) a protocol session between a control plane, CP, node and a user plane, UP, node;
Configuring (311), by the CP node, a first detection rule to be used for event notification, and at least one next detection rule to be used for traffic detection, wherein the first detection rule comprises an indicator indicating the highest precedence, and identifies a first instruction rule indicating an event to be notified and also identifies a continuation flag indicating evaluation of at least one next detection rule, and wherein the at least one next detection rule comprises an indicator indicating a lower precedence than the one in the first detection rule and identifies a next instruction rule to be applied to a matched traffic;
Transmitting (311), from the CP node, the first detection rule and the at least one next detection rule towards the UP node, and receiving (312), by the UP node, the first detection rule and the at least one next detection rule;

Determining (313), at the UP node, that a received packet matches the first detection rule;

Transmitting (314), from the UP node towards the CP node, a notification of the event indicated in the first instruction rule; and Determining (315), at the UP node based on the continuation flag, whether the received packet matches any detection rule amongst the at least one next detection rule from higher to lower precedence.

A2. The method of any of the previous embodiments in Group A, further comprising:
providing user data; and
forwarding the user data to a host computer via transmission to a base station.

Group B Embodiments

B1. A method (300) for evaluating data traffic in a communication network performed by a base station, the method comprising:
Establishing (310) a protocol session between a control plane, CP, node and a user plane, UP, node;
Configuring (311), by the CP node, a first detection rule to be used for event notification, and at least one next detection rule to be used for traffic detection, wherein the first detection rule comprises an indicator indicating the highest precedence, and identifies a first instruction rule indicating an event to be notified and also identifies a continuation flag indicating evaluation of at least one next detection rule, and wherein the at least one next detection rule comprises an indicator indicating a lower precedence than the one in the first detection rule and identifies a next instruction rule to be applied to a matched traffic;
Transmitting (311), from the CP node, the first detection rule and the at least one next detection rule towards the UP node, and receiving (312), by the UP node, the first detection rule and the at least one next detection rule;
Determining (313), at the UP node, that a received packet matches the first detection rule;
Transmitting (314), from the UP node towards the CP node, a notification of the event indicated in the first instruction rule; and
Determining (315), at the UP node based on the continuation flag, whether the received packet matches any detection rule amongst the at least one next detection rule from higher to lower precedence.

B2. The method of any of the previous embodiments in Group B, further comprising:
obtaining user data; and
forwarding the user data to a host computer or a wireless device.

Group C Embodiments

C1. A wireless device for evaluating data traffic in a communication network, the wireless device comprising:
processing circuitry configured to perform any of the steps of any of the Group A embodiments; and
power supply circuitry configured to supply power to the wireless device.

C2. A base station for evaluating data traffic in a communication network the base station comprising:
processing circuitry configured to perform any of the steps of any of the Group B embodiments;
power supply circuitry configured to supply power to the base station.

C3. A user equipment (UE) for evaluating data traffic in a communication network the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
the processing circuitry of the host computer is configured to execute a host application; and
the UE's processing circuitry is configured to execute a client application associated with the host application, thereby providing the user data.

D18. The communication system of any of embodiments D14 through D17, wherein:

the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:
at the UE, executing a client application, thereby providing the user data to be transmitted; and
at the host computer, executing a host application associated with the client application.

D22. The method of any of embodiments D19 through D21, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
the processing circuitry of the host computer is configured to execute a host application;
the UE is configured to execute a client application associated with the host application, thereby providing the user data to be received by the host computer.

D28. A method implemented in a communication system including a host computer, a base station and a user equipment (UE), the method comprising:
at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:

1. A method for evaluating data traffic in a communication network, the method comprising:
Establishing a protocol session between a control plane, CP, node and a user plane, UP, node;
Configuring, by the CP node, a first detection rule to be used for event notification, and at least one next detection rule to be used for traffic detection, wherein the first detection rule comprises an indicator indicating the highest precedence, and identifies a first instruction rule indicating an event to be notified and a continuation flag indicating evaluation of at least one next detection rule, and wherein the at least one next detection rule comprises an indicator indicating a lower precedence than the one in the first detection rule and identifies a next instruction rule to be applied to a matched traffic;
Transmitting, from the CP node, the first detection rule and the at least one next detection rule towards the UP node, and receiving, by the UP node, the first detection rule and the at least one next detection rule;
Determining, at the UP node, that a received packet matches the first detection rule;
Transmitting, from the UP node towards the CP node, a notification of the event indicated in the first instruction rule; and
Determining, at the UP node based on the continuation flag, whether the received packet matches any detection rule amongst the at least one next detection rule from higher to lower precedence.

2. A method according to claim 1, wherein upon determining, at the UP node, that the received packet matches any detection rule amongst the at least one next detection rule, the method comprises:
determining whether the matched next detection rule identifies the continuation flag;
if the continuation flag is identified, transmitting from the UP node towards the CP node, a notification of the event indicated in the instruction rule of the matched next detection rule and determining, at the UP node, whether the received packet matches any detection rule amongst other next detection rules from higher to lower precedence;
if the continuation flag is not identified, applying, at the UP node, the next instruction rule of the matched next detection rule to the matched packet, and stopping, at the UP node, the packet matching for the received packet.

3. A method according to claim 1, wherein any detection rule, amongst the first detection rule and the at least one next detection rule, is a Packet Detection Rule, PDR, that comprises a packet filter versus which packets are matched, and identifies one or more associated instruction rules.

4. A method according to claim 3, wherein the one or more associated instruction rules comprises at least one of:
a Forwarding Action Rule, FAR, which contains instructions related to the processing of the packets;
a Quality of Service Enforcement Rules, QER, which contains instructions related to the QoS enforcement of the traffic;
a User Reporting Rule, URR, which contains instructions related to traffic measurement and reporting; and
a Buffering Action Rule, BAR, which contains buffering rules to apply to the matching packets.

5. A method according to claim 4, wherein the continuation flag is included in one of: the PDR, the FAR, the QER, the BAR and the URR.

6. A method according to claim 4, wherein the first instruction rule indicating the event to be notified is the URR.

7. A method according to claim 1, wherein the event to be notified is any one of: tethering detection, video traffic start, and a specific application launch.

8. A method according to claim 1, wherein the CP node implements a Session Management Function, SMF, the UP node implements User Plane Function, UPF, and the protocol session is a Packet Forwarding Control Protocol, PFCP, session.

9. A method for evaluating data traffic in a communication network, the method carried out at a control plane, CP, node and comprising:
establishing a protocol session with a user plane, UP, node;
configuring a first detection rule to be used for event notification, and at least one next detection rule to be used for traffic detection, wherein the first detection rule comprises an indicator indicating the highest precedence, and identifies a first instruction rule indicating an event to be notified and a continuation flag indicating evaluation of at least one next detection rule, and wherein the at least one next detection rule comprises an indicator indicating a lower precedence than the one in the first detection rule and identifies a next instruction rule to be applied to a matched traffic;
transmitting, towards the UP node, the first detection rule and the at least one next detection rule; and
receiving, from the UP node, a notification of the event indicated in the first instruction rule.

10. A method according to claim 9, wherein the method comprises:
Receiving, from the UP node, a notification of an event indicated in a next instruction rule of the at least one next detection rule.

11. A method for evaluating data traffic in a communication network, the method carried out at a user plane, UP, node and comprising:
establishing a protocol session with a control plane, CP, node;
receiving, from the CP node, a first detection rule to be used for event notification, and at least one next detection rule to be used for traffic detection, wherein the first detection rule comprises an indicator indicating the highest precedence, and identifies a first instruction rule indicating an event to be notified and a continuation flag indicating evaluation of at least one next detection rule, and wherein the at least one next detection rule comprises an indicator indicating a lower precedence than the one in the first detection rule and identifies a next instruction rule to be applied to a matched traffic;

determining that a received packet matches the first detection rule;

transmitting, towards the CP node, a notification of the event indicated in the first instruction rule; and determining, based on the continuation flag, whether the received packet matches any detection rule amongst the at least one next detection rule from higher to lower precedence.

12. A method according to claim 11, wherein upon determining that the received packet matches any detection rule amongst the at least one next detection rule, the method comprises:

determining whether the matched next detection rule identifies the continuation flag;

if the continuation flag is identified, transmitting, towards the CP node, a notification of the event indicated in the instruction rule of the matched next detection rule and determining whether the received packet matches any detection rule amongst other next detection rules from higher to lower precedence;

if the continuation flag is not identified, applying the instruction rule of the matched next detection rule to the matched packet, and stopping the packet matching for the received packet.

13. A control plane, CP, node for evaluating data traffic in a communication network, the CP node being configured to:

establish a protocol session with a user plane, UP, node;

configure a first detection rule to be used for event notification, and at least one next detection rule to be used for traffic detection, wherein the first detection rule comprises an indicator indicating the highest precedence, and identifies a first instruction rule indicating an event to be notified and a continuation flag indicating evaluation of at least one next detection rule, and wherein the at least one next detection rule comprises an indicator indicating a lower precedence than the one in the first detection rule and identifies a next instruction rule to be applied to a matched traffic;

transmit, towards the UP node, the first detection rule and the at least one next detection rule; and receive, from the UP node, a notification of the event indicated in the first instruction rule.

14. A CP node according to claim 13, wherein further configured to:

receive, from the UP node, a notification of an event indicated in a next instruction rule of the at least one next detection rule.

15. A CP node according to claim 13, wherein any detection rule, amongst the first detection rule and the at least one next detection rule, is a Packet Detection Rule, PDR, that comprises a packet filter versus which packets are matched, and identifies one or more associated instruction rules.

16. A user plane, UP, node for evaluating data traffic in a communication network, the UP node being configured to:

establish a protocol session with a control plane, CP, node;

receive, from the CP node, a first detection rule to be used for event notification, and at least one next detection rule to be used for traffic detection, wherein the first detection rule comprises an indicator indicating the highest precedence, and identifies a first instruction rule indicating an event to be notified and a continuation flag indicating evaluation of at least one next detection rule, and wherein the at least one next detection rule comprises an indicator indicating a lower precedence than the one in the first detection rule and identifies a next instruction rule to be applied to a matched traffic;

determine that a received packet matches the first detection rule;

transmit, towards the CP node, a notification of the event indicated in the first instruction rule; and determine, based on the continuation flag, whether the received packet matches any detection rule amongst the at least one next detection rule from higher to lower precedence.

17. A UP node according to claim 16, wherein upon determining that the received packet matches any detection rule amongst the at least one next detection rule, the UP node is further configured to:

determine whether the matched next detection rule identifies the continuation flag;

if the continuation flag is identified, transmit, towards the CP node, a notification of the event indicated in the instruction rule of the matched next detection rule and determine whether the received packet matches any detection rule amongst other next detection rules from higher to lower precedence;

if the continuation flag is not identified, apply the instruction rule of the matched next detection rule to the matched packet, and stop the packet matching for the received packet.

18. A UP node according to claim 16, wherein any detection rule, amongst the first detection rule and the at least one next detection rule, is a Packet Detection Rule, PDR, that comprises a packet filter versus which packets are matched, and identifies one or more associated instruction rules.

* * * * *